United States Patent Office 3,271,199
Patented Sept. 6, 1966

3,271,199
SOLID ACID STORAGE BATTERY ELECTROLYTE
Hermann Beste and Alexander Koenig, Frankfurt am Main, Guenther Ryhiner, Bad Soden am Taunus, and Ernst Voss, Frankfurt am Main, Germany, assignors to Varta Aktiengesellschaft, Frankfurt am Main, Germany, a corporation of Germany
No Drawing. Filed Jan. 14, 1963, Ser. No. 251,005
Claims priority, application Germany, Jan. 20, 1962, A 39,254; Jan. 23, 1962, A 39,263
4 Claims. (Cl. 136—157)

The present invention relates to improvements in the manufacture of solidified or jelly electrolytes for lead-acid batteries.

Various attempts have been made to solidify the acidic electrolyte in storage battery cells to eliminate spilling, and for other reasons. No satisfactory electrolyte has been produced, however, because batteries containing such gel-like electrolytes do not have as good electrical properties as those with ordinary electrolytes. The internal resistance is higher and the capacity is lower. They do not last well in service. Materials that have been used in the past for making the electrolyte viscous have included albumen, starch, burnt clay, pumice, cellulose, soap, fatty acids, plaster of Paris, asbestos, sand, Fuller's earth and particularly water glass. The solidification of the electrolyte was brought about, in the latter case, by the formation of silicic acid. It has also been proposed to use colloidal silicon dioxide (silica) as a gelling agent for acidic electrolytes.

In addition to the above mentioned disadvantages of all of these thickeners, the resultant gels have a tendency to shrink after a short time so that the contact between the gel-like elecrolyte and the active mass in the battery cell is soon interrupted. Furthermore, their initial viscosity is so large that it is difficult, if not impossible, completely to fill the electrolyte chamber and the electrode pores with the solidified electrolyte.

It is a primary object of the present invention to overcome these disadvantages and to prepare a fully satisfactory jelly electrolyte for lead-acid battery cells.

It is a further object of this invention to prepare such a solidified electrolyte free of clumps and air occlusions.

We have found that these and other objects are accomplished in accordance with the invention by adding a pectin to a sulfuric acid electrolyte as gelling agent. This additive has been found neither to reduce the conductivity of the electrolyte nor disadvantageously to affect its properties in the battery to any noticeable extent. Unexpectedly and advantageously, pectins are very resistant to anodic oxidation during use of the battery.

Normally, lead-acid battery electrolytes consist of a 27% to 30% aqueous sulfuric acid solution and, in general, the addition of the pectin gelling agent to this solution does not exceed about 3% by weight of the sulfuric acid. The exact amount of gelling agent to be added will depend on the degree of electrolyte solidification desired. The minimum quantity of pectin having an esterification degree of 75% amounts to 0.3% by weight.

When a pectin solution and an aqueous sulfuric acid solution of the indicated conventional electrolyte concentration are mixed, the resultant sol shows little viscosity for several hours, usually about four to ten hours. This makes it possible to fill the electrolyte chambers of storage battery cells with this liquid sol readily and completely without the necessity of evacuating the electrolyte chambers. The entire electrolyte chamber and the battery plate pores will be fully occupied by the electrolyte within the period in which it remains a sol.

The time of transition from sol to gel may be varied widely by changing the concentration of the gelling agent in the electrolyte solution and/or by adjusting the temperature. The higher the concentration of the pectin solution and/or the temperature, the faster the sol will gel. If desired, these parameters may be so varied that the transition of sol to gel is postponed until after the battery has been put to use so that its operation is initiated with a liquid electrolyte. In this case, the electrolyte becomes a gel in situ. This assures a good adherence between the electrode active mass and the solidified electrolyte.

Under extended excess loads and the resultant decomposition of the water in the electrolyte gel, the electrolyte will shrink a little but insufficiently to cause an interrupion of contact between the solidified electrolyte and the active mass. Thus, a reduction in the capacity and an increase of the inner resistance of the battery is avoided.

As is usual in the production of liquid colloidal dispersions or solutions, the mixture of pectin and acidic electrolyte is produced by rapid stirring the same so as to avoid the formation of clumps. The resultant sol contains a large amount of air occluded in the form of light bubbles.

Removal of the occluded air is very difficult and often impossible, long periods of evacuation or centrifuging being necessary in the case of viscous sols, for instance.

However, sulfuric acid electrolyte sols for lead-acid batteries must be absolutely free of occluded air. Air bubbles in the solidified electrolyte would substantially increase the inner resistance of the battery. Furthermore, since work with sulfuric acid is dangerous, it is desirable to proceed in a simple manner and preferably in a single operation to the production of the air-free sol.

Accordingly and in accordance with a preferred embodiment of the present invention, a dry mixture of the pectin with colloidal silica is first produced and this mixture is then stirred in a conventional sulfuric acid electrolyte.

An addition of between about 5% and 80%, by weight, of colloidal silica is suitable for the purposes of this invention, the preferred mixture consisting of about 20%, by weight, of the pectin and 80%, by weight, of colloidal silica.

The colloidal silica will preferably have a surface area of 100–500 sq. m./g., preferably about 350–460 sq. m./g. We have found the colloidal silica sold by Degussa of Frankfurt am Main, Germany, under the trademark "Aerosil" to be useful for this purpose.

Surprisingly, such a dry mixture may be dispersed into an aqueous sulfuric acid solution of the indicated concentration in a short time in a mixer using relatively slow stirring to form a smooth sol. Since slow stirring is used, no air occlusion occurs. The resultant sol may be used for filling storage battery cells in the indicated manner and will gel in the cell to form an effective gel-like electrolyte.

Without in any way limiting the present invention thereto, the following examples will illustrate the practice of the invention:

*Example 1*

100 cc. of sulfuric acid of a density of 1.285 were mixed by stirring with 1 g. of pectin. The resultant sol was poured into a lead-acid battery cell. Within six hours, the sol had penetrated into the pores of the active mass of the battery plates and solidified into a gel. With dry-charged plates, the battery was ready for operation after six hours.

A series of battery cells with this electrolyte were subjected to seventy charges and discharges with no decomposition of the pectin in the electrolyte. The battery cells remained fully operative at temperatures up to 50° C. and their ability to start at low temperatures was in no way impaired. The addition of the pectin being of a colloidal nature and in relatively small amounts, the electrical resistance of the electrolyte did not differ significant from the same electrolyte without the pectin addition.

Similar results were obtained when the pectin addition was changed to 3 g./100 cc. of sulfuric acid of the above indicated density, except that the sol gelled after 4 hours.

*Example 2*

10 g. of dry pectin and 1 g. of colloidal silica having a surface area of about 400 sq. m./g. were mixed in a mortar to form a homogeneous mixture. One gram of this dry mixture was added to 100 g. of the aqueous sulfuric acid solution of Example 1 while the mixture was stirred at about 400 r.p.m. After five minutes, a sol free of clumps and occluded air was obtained. This sol was used in the same manner as in Example 1 with similar results.

*Example 3*

2 g. of dry pectin and 8 g. of a colloidal silica having a surface area of about 400 sq. m./g. were mixed in a mortar to form a homogeneous mixture. Four grams of this dry mixture were added to 100 g. of the aqueous sulfuric acid solution of Example 1 while the mixture was stirred at about 400 r.p.m. After five minutes, a sol free of clumps and occluded air was obtained. This sol was used in the same manner as in Example 1 with similar results.

In all three examples pectins having an esterification degree of from 60 to 80%, preferably 75%, and a molecular weight of from 20,000 to 400,000 have been used. The equivalent weight was from 180 to 190.

We claim:

1. A gelled storage battery electrolyte consisting essentially of an aqueous sulfuric acid solution, pectin and colloidal silica, the electrolyte containing at least about .3% of pectin by weight of the sulfuric acid solution.

2. The sulfuric acid electrolyte of claim 1, wherein said mixture consists of about 20%, by weight, of the pectin and about 5% to about 80%, by weight, of the colloidal silica.

3. The sulfuric acid electrolyte of claim 1, containing from about 0.5% up to about 5%, by weight of the sulfuric acid, of the mixture of pectin and colloidal silica.

4. A gelled storage battery electrolyte consisting essentially of a mixture of an aqueous sulfuric acid solution, pectin and colloidal silica, said mixture containing between about 5% and about 80%, by weight, of colloidal silica and at least about 0.3% of pectin by weight of the sulfuric acid solution.

References Cited by the Examiner

UNITED STATES PATENTS 2,628,153   2/1953   Noyes et al. _____ 106—38.35

FOREIGN PATENTS 2,297   1889   Great Britain.
769,850   3/1957   Great Britain.
54,494   5/1943   Netherland.

OTHER REFERENCES

"Dieelectrics for galvanic plate cells," Chemical Abstract 46: p. 10493e, October-November 1952.

WINSTON A. DOUGLAS, *Primary Examiner.*

JOHN H. MACK, *Examiner.*

D. L. WALTON, *Assistant Examiner.*